Patented Oct. 28, 1941

2,260,417

UNITED STATES PATENT OFFICE 2,260,417

TREATING FATTY OILS AND THE LIKE

James M. Whiteley, Elizabeth, and Luther B. Turner, Roselle Park, N. J., assignors to Standard Oil Development Company, a corporation of Delaware No Drawing. Application March 15, 1938, Serial No. 196,088

16 Claims. (Cl. 252—56)

This invention relates to improved processes for treating fatty oils and the like and to the products produced thereby.

The purpose of the treatment is to thicken the oil or to improve its properties without thickening, and the treatment comprises altering the structure of the oil, as by isomerization and/or particularly by polymerization.

It has been known that certain vegetable oils, especially of the rapid-drying type, can be polymerized by mere heating and in some instances a polymerized product of fairly good color can be obtained. However, with other oils of the semi-drying and especially the non-drying type, the amount of polymerization which can be effected is relatively small and is usually accompanied by a darkening of the product.

It has now been discovered that vegetable, animal, fish, and similar oils, which for the sake of brevity will be termed "fatty oils," can be reconstituted as by polymerization very satisfactorily by the use of a boron halide catalyst, especially boron fluoride. The use of this catalyst enables the reaction to be carried out at lower temperature than would otherwise be possible and it produces a product of light color and good solubility in mineral oils, a feature to be desired when it is intended to use the polymerized product for thickening mineral lubricating oils. The use of this process also results in a product having a lower acid number than can be obtained with mere heating of the oil. This applies especially to the semi- and non-drying oils.

This is a continuation-in-part of application 692,618 filed October 7, 1933.

The present invention may be carried out in a number of different ways, one satisfactory method being to bubble the boron fluoride gas through the oil, or through a solution of the oil dissolved in a suitable solvent, with agitation, until the desired amount of catalyst has been dissolved and then to allow the mass to stand at the proper temperature until it has thickened to the desired degree. After standing for the required period of time, which may be anywhere from a few minutes to several hours or several days or even a week or longer, the product is washed with water in order to liberate the boron fluoride from the polymerized complex. The boron fluoride is hydrolyzed with the liberation of hydrofluoric acid and an acid of boron. By this washing treatment, the color is considerably improved but it may be still further improved by a subsequent washing with a dilute (1% or so) solution of sodium hydroxide preferably containing some alcohol. The product is then subjected to distillation at atmospheric pressure, or under vacuum, in order to remove the solvent. The product obtained will be more viscous than the original oil treated, the amount of increase in viscosity depending largely upon the temperature, the time of standing (the time of contact between the catalyst and the oil), the dilution of the oil, and the concentration of the boron fluoride. Any degree of polymerization may be obtained, from a light or even thick liquid up to a grease-like or plastic solid. For instance, linseed oil can be polymerized to the consistency of art gum.

During the polymerization, other characteristics of the oil are changed, for instance, the iodine and saponification numbers are decreased, while the acid number is slightly increased.

The conditions under which the process is carried out may vary over a wide range, depending upon the raw material being treated and the type of product desired. In most instances, the temperature should be either room temperature or somewhat lower, for example, 0° F. or even 10° F. or more below zero. Higher temperatures may be used in order to accelerate the reaction, but if too high, the product becomes darker and less soluble in mineral oils. The pressure under which the reaction is carried out is preferably atmospheric although superatmospheric pressures may be used in order to increase the solubility of the gaseous catalyst at higher temperatures. The oil to be treated may be any unsaturated vegetable, animal or fish oil of either the fast-drying, or semi-drying types. For instance, as shown in the examples given hereinbelow, good results have been obtained with linseed oil, rapeseed oil and whale oil. Other vegetable oils which may be used include castor, cottonseed and tung oils. Also, soy bean, peanut, rapeseed, sesame, corn, menhaden and cod oils, and the like, may be so treated. Not only can the oils themselves be treated but also the fatty acids derived therefrom, such as corn oil acids, cottonseed oil acids, ricinoleic acid, oleic acid, and the like, or more or less analogous materials such as the unsaturated acids obtained by the oxidation of paraffin wax. Also, esters derived from these various fatty oils may be used in the process, for example: partially hydrogenated fatty oils or synthetic esters as alkyl ricinoleate, butyl ricinoleate (from castor oil) and butyl ricinoleate acetylated.

Co-polymerization may also be used, as by reacting a drying oil with a polymerizable petroleum derivative such as isobutylene or the unsaturated wax acids from wax oxidation, etc.

In carrying out the polymerization, either the oils or their derivatives may be treated alone or diluted with suitable solvents such as various light hydrocarbon liquids to lower the rate of reaction and give ease in handling, agitating, etc. Varsol, which represents a refined petroleum product having a boiling range corresponding approximately to that of kerosene, and "56° naphtha," having a boiling point corresponding to that of the lighter gasoline range, are two suitable solvents. Instead of using boron fluoride as the catalyst, other boron halides, such as boron chloride, may be used, although the boron fluoride is the most active, or these boron halide catalysts may be used in conjunction with other materials such as hydrogen fluoride or various organic compounds with which they form complexes.

It is not desired that the invention be limited to carrying out the process in the particular manner described hereinabove, namely by bubbling the gas through the oil either alone or mixed with a solvent. The oil may be injected into and agitated in a closed container having an atmosphere of boron fluoride. Any other suitable method of maintaining the catalyst in contact with the oil for the desired reaction period (preferably with agitation) may be used.

The polymerized product may be hydrogenated if desired and blended with dyes, oxidation inhibitors, sludge dispersers, load carrying agents, soaps, pour inhibitors, etc.

The following examples are given merely by way of illustration:

Example 1

250 cc. of whale oil (a semi-drying oil) were diluted with 200 cc. of Varsol and treated with boron fluoride by bubbling the gas through the solution for 1 hour at a temperature between 0 and —10° F. The solution was allowed to stand 2 days, after which time the oil, after solvent removal, was found to have increased in viscosity from 55 to 218 seconds Saybolt at 210° F. and the product had an acid number of 8.4, an iodine number of 68.7, a saponification number of 173.6, had good color, and was also soluble, e. g. up to 50% in Pennsylvania grade mineral oil.

Example 2

To show the effect of higher temperature, a sample of the same whale oil as used in Example #1 was treated with boron fluoride, then heated to 450° F. for 1½ hours until the pressure reached a value of 300 pounds per square inch. The product had a viscosity of 340 seconds Saybolt at 210° F.; it had a dark color and was insoluble in mineral oils. However, this product may be used as a gear oil or as a compounding agent in greases.

Example 3

800 cc. of whale oil were diluted with 400 cc. of "56 naphtha" and treated with $BF_3$ for 40 minutes at a temperature of —30° F. The solution was immediately washed and the polymerized product found to have a viscosity of 72 seconds compared to 55 for the original oil. It was soluble in and may be blended with Pennsylvania, Coastal, and Mid-Continent distillates and bottoms and synthetic oils as those obtained by treating olefins with cracked wax.

Example 4

500 grams of rapeseed oil (a non-drying oil) were dissolved in 200 cc. of 55 naphtha and treated with a slow stream of boron fluoride for 1½ hours at room temperature. The solution was then allowed to stand for 2 days. The original oil and final product had the following viscosity characteristics:

|  | Original oil | Final product |
|---|---|---|
| Vis./100° F | 241 | 268 |
| Vis./210° F | 59 | 65 |
| V. I. | 147.5 | 152 |

This product was soluble in mineral oils when used up to 50% or even more.

Example 5

Linseed oil (a drying oil) was diluted with an equal volume of naphtha and treated for 10 minutes with boron fluoride at room temperature. After standing 1 week the following changes in viscosity characteristics were observed:

|  | Original oil | Final product |
|---|---|---|
| Vis./100° F | 141 | 1767 |
| Vis./210° F | 43 | 265.5 |
| V. I.[1] |  | 134 |

[1] Viscosity index (V. I.) represents a relation between the viscosity at 210° and that at 100° F. as explained in an article published by Dean and Davis in Chem. & Met. Eng., vol. 36, p. 618–9 (1929).

This viscous product may be used in greases, etc.

Example 6

Approximately 1 lb. of $BF_3$ per gallon of oil was dissolved in rapeseed oil without diluent at about 80° F. and the solution was divided into three parts, each allowed to set a different length of time before hydrolysis of the catalyst and recovery of the oil. The following table gives the results obtained:

| Time of reaction, hours | Feed stock | 1¾ hours | 46 hours | 120 hours |
|---|---|---|---|---|
| Gravity | 23.2 | 22.7 | 20.5 | 19.7 |
| Vis./100° F | 234 | 320 | 2028 | 2811 |
| Vis./210° F | 61.7 | 70.4 | 226 | 283 |
| Iodine No | 103 | 100 | 74.5 | 86 |
| Acidity | 0.2 | 1.5 | 9.8 | 17.0 |
| Sap. No | 175 | 172 | 169 | 170 |

In order to compare the polymerization of fatty oils by boron fluoride with heat polymerization of the same oil, a sample of the same rapeseed oil as was used in the above experiments was heat-thickened for 8 hours at 600° F. (without any $BF_3$), and the polymer obtained was found to have the characteristics indicated here below.

For the sake of comparison of characteristics of the rapeseed oil polymerized by boron fluoride to the same viscosity at 210° F., as estimated graphically from the above series of tests, is shown alongside the data on the heat-thickened oil.

| Property | Heat polymer | $BF_3$ polymer (estimated) |
|---|---|---|
| Gravity | 21.3 | 21.2 |
| Vis./100° F | 1320 | 1150 |
| Vis./210° F | 164 | 164 |
| Iodine No | 81 | 82 |
| Acidity | 30.8 | 6 |
| Sap. No | 162 | 170 |

This table clearly shows that the $BF_3$ polymer had a surprisingly lower acidity, slightly higher saponification number and a substantially lower viscosity at 100° F. which means therefore that it had a flatter viscosity-temperature curve.

For the sake of contrast, another series of tests on a heat-thickened oil is reported herewith showing the characteristics of a polymer at several different stages during the polymerization. As the sample of rapeseed oil used in this instance was a different one than used in the above tests, the results cannot be considered precisely parallel but they do emphasize the tremendous increase in acidity which accompanies the heat polymerization of fatty oils. A sample of rapeseed oil was polymerized by heating at about 600° F. at atmospheric pressure (in contact with air), with the following results:

| Oil | Hrs. of heating | Vis./210° F. | Acidity | Sap. No. | I. No. |
|---|---|---|---|---|---|
| Original | | 60.4 | 0.6 | 175 | 97.5 |
| Same, after heating | 13 | 138.0 | 68.0 | 165 | |
| Do | 20 | 160.0 | 87.5 | 167 | 63.0 |
| Do | 27 | 163.0 | 105.0 | 164 | 52.0 |

This table shows that the heat polymerization causes a tremendous rise in the acidity, far greater than in the case of polymerization of the same oil with $BF_3$ at room temperature. This table also shows that heat polymerization causes a substantially greater decrease in the iodine number and that in the heat polymerization although the viscosity at 210° F. at first rises about as rapidly as with the boron fluoride, yet after a substantial amount of heating the further increase in viscosity is very slight (it may even be that the viscosity has reached the maximum and would be further reduced by further heating, due to decomposition of some of the reaction products). It is believed that heat polymerization (as normally carried out in contact with air) causes oxidation of some of the unsaturate compounds into rubbery materials and at the same time, whether in contact with air or not, causes other compounds to break up into relatively low molecular weight acids. If these acids are removed by air blowing or the use of vacuum the yield of the product is substantially reduced.

The various advantages of the use of boron fluoride at low temperature as compared to heat polymerization without boron fluoride may be summarized briefly as follows. The polymer has a lighter color, less acid, greater solubility in mineral oils, flatter viscosity-temperature curve, and better stability. Also, the mere fact that it can be made at room temperature, i. e., without the application of any heat is also an economic advantage.

Example 7

Two of the rapeseed oil samples treated in Example 6 were blended in 20% concentrations with a Coastal lubricating oil and the following viscosity characteristics resulted:

| | Vis. at 100° F. | Vis. at 210° F. | V. I. |
|---|---|---|---|
| 100% Coastal oil | 358 | 49 | 25 |
| 100% rapeseed oil (treated 1¼ hrs.) | 320 | 70 | 153 |
| 80% Coastal oil+20% rapeseed oil (treated 1¼ hrs.) | 332 | 53 | 91 |
| 100% rapeseed oil (treated 46 hrs.) | 2028 | 226 | 156 |
| 80% Coastal oil+20% rapeseed oil (treated 46 hrs.) | 509 | 62 | 90 |

Example 8

Inasmuch as heat-thickening increases the acidity and at least a substantial proportion of the acids produced are volatile, a sample of cottonseed oil was polymerized at 300° C. for 16 hours in vacuum (a pressure of 10 mg. mercury) to suck off the volatile acids formed; the mass was agitated with hydrogen. The resulting polymer had a viscosity of 622 seconds Saybolt at 210° F. and an acidity of 11.9.

In contradistinction to these results, a similar sample of cottonseed oil was diluted with an equal volume of naphtha, and the solution was treated with 24% of $BF_3$ for a period of 20 hours at 20° C. The resulting polymer had a viscosity of 939.2 seconds Saybolt at 210° F. and an acidity of 2.5 mg. KOH per gram of oil, the saponification number being 205 and the iodine number 46.4. The product had a good color. This shows that the boron fluoride polymerization resulted in a product having a very much lower acidity for a product having a somewhat greater viscosity even though the heat polymerization was carried out in vacuum to prevent accumulation of acids.

Example 9

A sample of cottonseed oil was diluted with an equal volume of naphtha and the solution was treated with approximately 25% $BF_3$ at 20° C. for 20 hours. The product had a viscosity of 1403 seconds Saybolt at 210° F. During the actual addition of $BF_3$ the temperature rose to 61° C., but soon after was reduced to 20° C.

Example 10

A sample of cottonseed oil was diluted with 2 parts by volume of naphtha to 1 volume of oil and the solution was treated with 25% by weight of $BF_3$ at 20° C. for 72 hours. The polymer had a viscosity of 11,600 seconds Saybolt at 210° F.

Example 11

Another sample of cottonseed oil was diluted with 2 volumes of naphtha to 1 of oil and the mixture was treated with approximately 25% $BF_3$, the latter being fed through a porous thimble in order to obtain a fine dispersion of the gaseous catalyst in the oil. The reaction temperature was 20° C. and the reaction period 43 hours. The resultant polymer had an extremely high viscosity of 50,000 seconds at 210° F.

Inasmuch as the above description and examples have been given merely for the sake of illustration and not for the purpose of limiting the invention thereto, it is intended to claim all inherent novelty in the invention as broadly as the prior art permits.

We claim:

1. A process for the manufacture of high viscosity products by polymerization of fatty oils and comprising intensively polymerizing unsaturated fatty oils by contacting them at a temperature approximately room temperature with relatively small quantities of boron fluoride acting as a catalyst.

2. A lubricant comprising a mineral lubricating oil and a viscosity-increasing amount of an oil-soluble polymerized fatty oil obtained by treatment of an unsaturated semi-drying fatty oil with boron fluoride at a temperature approximately room temperature.

3. A process for producing improved fatty oil polymers which comprises polymerizing an unsaturated fatty oil with boron fluoride at a temperature below 0° F.

4. A process for producing improved fatty oil polymers comprising polymerizing a semi-drying oil in the presence of at least about one-half its volume of a volatile hydrocarbon solvent, with boron fluoride at a temperature below about 0° F.

5. The process which comprises treating fatty oils including unsaturated vegetable, animal and fish oils and their fatty acids and esters of these fatty acids thereof with a boron halide catalyst, at a temperature not substantially above normal room temperature.

6. The process which comprises polymerizing one part by volume of unsaturated fatty oil in the presence of at least ½ part by volume of an inert volatile solvent, using a boron halide catalyst and a temperature not substantially above room temperature.

7. The process which comprises dissolving boron fluoride in a solution of an unsaturated fatty oil in at least an equal volume of an inert volatile solvent, allowing the solution to stand at a desired reaction temperature not substantially above room temperature until the desired degree of polymerization has been effected, and recovering the polymerized oil.

8. The process of preparing polymers of fatty oil compounds selected from the group consisting of drying and semi-drying oils and their fatty acids and esters of these fatty acids, which comprises mixing one volume of said oil with at least ½ volume of an inert solvent, and then contacting the mixture with a boron halide catalyst at a temperature not substantially above 0° F.

9. A process for manufacturing high viscosity products comprising the steps of treating a semi-drying fatty oil with boron trifluoride, at approximately room temperature in the presence of a volatile hydrocarbon solvent to produce a high molecular weight polymer substance, and thereafter purifying the polymer material by a washing step utilizing an alkaline solution.

10. A process for manufacturing high viscosity products comprising the steps of treating a semi-drying fatty oil with boron trifluoride, at approximately room temperature in the presence of a volatile hydrocarbon solvent to produce a high molecular weight polymer substance, and thereafter purifying the polymer material by a washing step utilizing an alkaline solution of dilute alcohol in water.

11. A process for manufacturing high viscosity products comprising the steps of treating a semi-drying fatty oil with boron trifluoride, at approximately room temperature in the presence of a volatile hydrocarbon solvent to produce a high molecular weight polymer substance, thereafter purifying the polymer material by a washing step utilizing an alkaline solution of dilute alcohol in water and thereafter dissolving the washed polymer in a hydrocarbon oil.

12. A process for the manufacture of high viscosity products comprising in combination the steps of dissolving a semi-drying fatty oil in a light hydrocarbon liquid, treating the solution with boron trifluoride at approximately room temperature, removing the light hydrocarbon oil, washing the resultant polymer with dilute alkaline solution of alcohol and water, and thereafter dissolving the polymer in a heavier hydrocarbon oil having lubricating characteristics.

13. A lubricant comprising as its lubricating component a mixture of a viscous hydrocarbon oil and a small quantity of polymerized components which are active in raising the viscosity index of said lubricating oil, said active polymerized components being separated from a crude polymerized fatty oil produced by treating a semi-drying fatty oil with boron fluoride at a reaction temperature not substantially above room temperature, said crude polymerized fatty oil being a mixture of said polymerized active components and of colored components which are substantially inactive in raising the viscosity of the hydrocarbon oil when blended therewith in small proportions, said colored component being that portion of the crude polymerized fatty oil which is, in the presence of said substantially active components, soluble in alkaline aqueous alcohol at ordinary room temperature.

14. The process of producing polymers suitable for lubricants from semi-drying fatty oils comprising the steps of treating said oil with a small amount of anhydrous boron fluoride at approximately room temperature and for a time sufficient to produce a polymer which is soluble in hydrocarbon oils and capable of materially raising the viscosity of a viscous hydrocarbon oil when dissolved therein in small quantities.

15. The process of producing polymers suitable for lubricants from semi-drying fatty oils comprising the steps of treating said oil with a small amount of anhydrous boron fluoride at approximately room temperature and for a time sufficient to produce a polymer which is soluble in hydrocarbon oils and capable of materially raising the viscosity of a viscous hydrocarbon oil when dissolved therein in small quantities, purifying the said oil polymer by washing with alkaline solution of dilute alcohol.

16. The process of producing polymers suitable for lubricants from semi-drying fatty oils comprising the steps of treating said oil with a small amount of anhydrous boron fluoride at approximately room temperature and for a time sufficient to produce a polymer which is soluble in hydrocarbon oils and capable of materially raising the viscosity of a viscous hydrocarbon oil when dissolved therein in small quantities, purifying the said oil polymer by washing with alkaline solution of dilute alcohol and thereafter dissolving the washed polymer in a hydrocarbon oil.

JAMES M. WHITELEY.
LUTHER B. TURNER.